United States Patent
Sasaki

(10) Patent No.: US 9,122,001 B2
(45) Date of Patent: Sep. 1, 2015

(54) DRIVING APPARATUS, AND LENS APPARATUS AND IMAGE PICKUP APPARATUS INCLUDING THE SAME

(71) Applicant: CANON KABUSHIKI KAISHA, Tokyo (JP)

(72) Inventor: Ryohei Sasaki, Utsunomiya (JP)

(73) Assignee: CANON KABUSHIKI KAISHA (JP)

( * ) Notice: Subject to any disclaimer, the term of this patent is extended or adjusted under 35 U.S.C. 154(b) by 0 days.

(21) Appl. No.: 14/137,045

(22) Filed: Dec. 20, 2013

(65) Prior Publication Data

US 2014/0178058 A1    Jun. 26, 2014

(30) Foreign Application Priority Data

Dec. 26, 2012   (JP) .................. 2012-282224

(51) Int. Cl.
```
G03B 17/00      (2006.01)
G02B 7/09       (2006.01)
G03B 3/10       (2006.01)
G01D 5/244      (2006.01)
```
(52) U.S. Cl.
CPC *G02B 7/09* (2013.01); *G01D 5/244* (2013.01); *G03B 3/10* (2013.01)

(58) Field of Classification Search
USPC .................. 396/80, 85, 87, 133; 348/240.99; 33/1 PT, 706–707
See application file for complete search history.

(56) References Cited

U.S. PATENT DOCUMENTS

| 7,012,704 B2 | 3/2006 | Suzuki et al. | |
| 2012/0124848 A1* | 5/2012 | Kirchberger et al. | ......... 33/1 PT |
| 2013/0050558 A1* | 2/2013 | Katsumata et al. | ........... 348/335 |

FOREIGN PATENT DOCUMENTS

| JP | 09184954 A | 7/1997 |
| JP | 2005283274 A | 10/2005 |
| JP | 2009276128 A | 11/2009 |

* cited by examiner

*Primary Examiner* — Minh Phan
(74) *Attorney, Agent, or Firm* — Rossi, Kimms & McDowell LLP

(57) ABSTRACT

Provided is a driving apparatus for driving a movable optical member, the driving apparatus being removably attached to a lens barrel, the driving apparatus including: a rotary absolute position detector detecting a position of which the movable optical member, the rotary absolute position detector outputting an output value having a unique value with respect to a rotation angle within a range of a single rotation, and the output value having a point of discontinuity at which the output value is discontinuous every single rotation; and a controller performing boundary processing that handles the output value, corresponding to a driving range of the movable optical member, of the rotary absolute position detector having the point of discontinuity as a continuous value.

16 Claims, 10 Drawing Sheets

DRIVING APPARATUS, AND LENS APPARATUS AND IMAGE PICKUP APPARATUS INCLUDING THE SAME

BACKGROUND OF THE INVENTION

1. Field of the Invention

The present invention relates to a driving apparatus for driving a lens apparatus. More particularly, the present invention relates to a driving apparatus fitted to an image pickup lens and including a rotary absolute position detector, and a lens apparatus and an image pickup apparatus including the same.

2. Description of the Related Art

A lens apparatus of a portable type represented by an electronic news gathering (ENG) lens includes a lens barrel including an operation ring for driving a zoom lens and a focus lens, and a driving apparatus for detecting the position of the operation ring and driving the operation ring. Further, with regard to a lens apparatus used at the site of filming, delicate operation thereof is required. Thus, a lens apparatus dedicated to manual operation, that is, a lens apparatus without a driving apparatus in which the operation ring is operated only manually is known. However, when zoom operation from a wide angle side to a telephoto side at a fixed speed or the like is required, it is desired to drive the operation ring using a servomechanism included in the driving apparatus. Further, other kinds of use such as fitting and removing the driving apparatus by a user oneself are also thought of, including a case where the driving apparatus is fitted to a lens apparatus without a driving apparatus to make a film at the site of filming.

By the way, conventionally, as a position detection sensor used for a driving apparatus, a potentiometer (hereinafter also referred to as POT) or an incremental encoder is used. A POT is a sensor which detects the position of a target of the control and outputs voltage corresponding to the detected position, and can detect an absolute position.

An incremental encoder is a sensor which detects a relative change in position of the target of the control. The incremental encoder can detect a relative position more accurately than a POT, but, for the purpose of detecting an absolute position, initialization processing is necessary after power on or after a reset operation. Specifically, the initialization processing is performed by obtaining an origin pulse which is output from a Z phase to be a reference in detecting the absolute position.

Output voltage of a POT generally varies from a minimum value to a maximum value in a single rotation. However, the range in which the position can be actually detected is limited to about 340° of a single rotation (360°). The remaining range of about 20° is a dead zone in which the position cannot be detected. Therefore, it is necessary to make an adjustment for establishing correspondences between the movable range of the target of the control and the range in which the POT can detect the position.

Therefore, there is a driving apparatus using a POT as the position detection sensor which, by using a slip mechanism, makes an adjustment so that the dead zone of the POT does not overlap the movable range of the operation ring which is the target of the control after the driving apparatus is fitted to a lens barrel. However, in this case, it is necessary to additionally provide the slip mechanism.

Japanese Patent Application Laid-open No. 2005-283274 discloses a technology of, in a position detecting device using an incremental encoder and an absolute position detector (such as POT), rotating the incremental encoder multiple times for the purpose of enhancing the resolution of the position detector. The multiple rotations cause the Z phase to appear multiple times. Correspondences between the position of the Z phase and the output value of the POT are established and stored. By, when the power is turned on, driving the target to be driven to the nearest Z phase position with the output value of the POT being the clue, the absolute position can be detected.

In Japanese Patent Application Laid-Open No. 2009-276128, a position detecting device using an incremental encoder and a POT divides in advance a driving range based on the output value of the POT in a lens driving area, and an adjustment is made in advance so that only one Z phase of the incremental encoder exists in each divided area. By storing, at the time of initialization, an encoder pulse from one end point to each origin signal (Z phase) and the total pulses in the whole area, the absolute position can be determined after the power is turned on based on area detection by the origin pulse and the output value of the POT and on the number of encoder pulses which is stored.

However, the related-art technology disclosed in Japanese Patent Application Laid-open No. 2005-283274 described above is on the assumption that the dead zone of the output value of the POT does not exist in the lens driving area. Further, the related-art technology disclosed in Japanese Patent Application Laid-Open No. 2009-276128 makes an adjustment in advance so that only one Z phase of the incremental encoder exists in each area divided based on the output value of the POT. To make the above-mentioned adjustment so that the position detection sensor is located at a desired position when a lens barrel and a driving apparatus are connected to each other is very complicated and troublesome to accomplish for an ordinary user.

SUMMARY OF THE INVENTION

Accordingly, the present invention provides a driving apparatus which can detect an absolute position without the necessity for a special mechanism such as a slip mechanism and initial adjustment of a position detector when connected to a lens barrel.

In order to achieve the above-mentioned object, according to one embodiment of the present invention, there is provided a driving apparatus for driving a movable optical member, the driving apparatus being removably attached to a lens barrel, the driving apparatus including: a rotary absolute position detector detecting a position of which the movable optical member, the rotary absolute position detector outputting an output value having a unique value with respect to a rotation angle within a range of a single rotation, and the output value having a point of discontinuity at which the output value is discontinuous every single rotation; and a controller performing boundary processing that handles the output value, corresponding to a driving range of the movable optical member, of the rotary absolute position detector having the point of discontinuity as a continuous value.

According to one embodiment of the present invention, it is possible to provide the driving apparatus which can detect the absolute position without the necessity tor a special mechanism such as a slip mechanism and initial adjustment of the position detector when connected to a lens barrel, and provide a lens apparatus and an image pickup apparatus including the driving apparatus.

Further features of the present invention will become apparent from the following description of exemplary embodiments with reference to the attached drawings.

DESCRIPTION OF THE EMBODIMENTS

Exemplary embodiments of the present invention are described in detail in the following with reference to the attached drawings.

Embodiment 1

In the following, with reference to FIG. 1 to FIG. 11, a driving apparatus of a lens barrel according to a first embodiment of the present invention is described. The driving apparatus of a lens barrel can detect an absolute position without the necessity for an adjustment of a position detector for a movable optical member such as a zoom lens or a focus lens when connected to the lens barrel including an operation ring for driving the zoom lens or the focus lens and without the necessity for a special mechanism. The absolute position as used herein means a position of, for example, the zoom lens or the focus lens in a driving range, and a position with respect to a predetermined reference point (for example, one end in the driving range).

In this embodiment, a case where a rotary absolute encoder is used as an absolute position detector is described.

Even when a driving apparatus and a lens barrel are connected to each other with the rotational position of the absolute encoder being an arbitrary position, the absolute position can be detected. Further, the present invention is applicable irrespective of the rotational amount of the absolute encoder with respect to the movable range of the operation ring which is to be driven by the driving apparatus.

Figure 1:
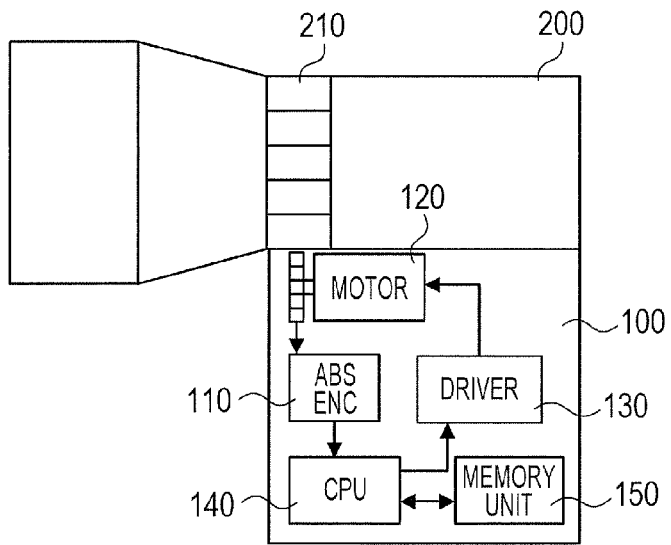
FIG. 1 is a block diagram illustrating a structure of a driving apparatus according to a first embodiment of the present invention.

FIG. 1 is a block diagram illustrating a structure of a driving apparatus according to the embodiment of the present invention. The driving apparatus of the present invention is removably fitted to a lens apparatus. FIG. 1 illustrates a state after the driving apparatus of the present invention and a lens barrel are connected to each other.

A driving apparatus 100 mainly includes an absolute encoder 110, a motor 120, a driver 130, a CPU 140 as a controller, and a memory unit 150. The absolute encoder 110 is connected via a gear (not shown) to an operation ring 210 of a lens barrel 200. The absolute encoder 110 itself rotates in accordance with the rotation of the operation ring 210, and outputs, to the CPU 140, an output value in accordance with its own rotational position.

The CPU 140 detects the position of the operation ring 210 based on the output value of the absolute encoder 110. Further, the CPU 140 computes a command value for driving the operation ring 210 and outputs the command value to the driver 130. Further, the CPU 140 stores edge positions of the operation ring 210 in the memory unit 150.

The operation ring 210 has mechanical edges which limit the operating range, and is, based on a drive command from the CPU 140, rotated by the motor 120 which is driven via the driver 130.

Here, the absolute encoder 110 is described in detail.

Figure 2:
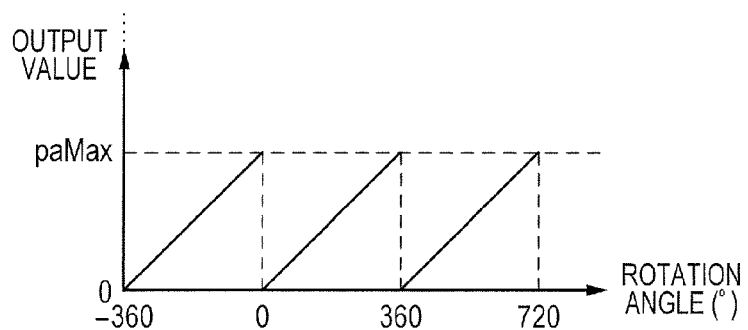
FIG. 2 is an explanatory diagram of an output value of an absolute encoder in the first embodiment.

FIG. 2 is a graph showing the relationship between the rotational position and the output value of the absolute encoder 110 in this embodiment. The absolute encoder 110 outputs a value in a range from zero to a maximum value paMax. Further, when the absolute encoder 110 is rotated in a forward direction, the output value increases, and, when the absolute encoder 110 is rotated in a reverse direction, the output value decreases. For example, as shown in FIG. 2, a position at which the output value of the absolute encoder 110 is zero is regarded as 0 degree. When the absolute encoder 110 is rotated in the forward direction, the output is the maximum value paMax immediately before a single rotation, and the output is zero at the very position of a single rotation immediately after a single rotation. After that, as the absolute encoder 110 is rotated further in the forward direction, the output value increases, and zero is output every single rotation. This cycle is repeated. On the other hand, when the absolute encoder 110 is rotated in the reverse direction, the output value decreases from the maximum value paMax toward zero. Immediately after zero is output, the maximum value paMax is output, and, as the absolute encoder 110 is rotated further in the reverse direction, the output value decreases.

Next, a method of detecting the position of the operation ring 210 using the absolute encoder 110 is described together with processing performed by the CPU 140.

Figure 3:
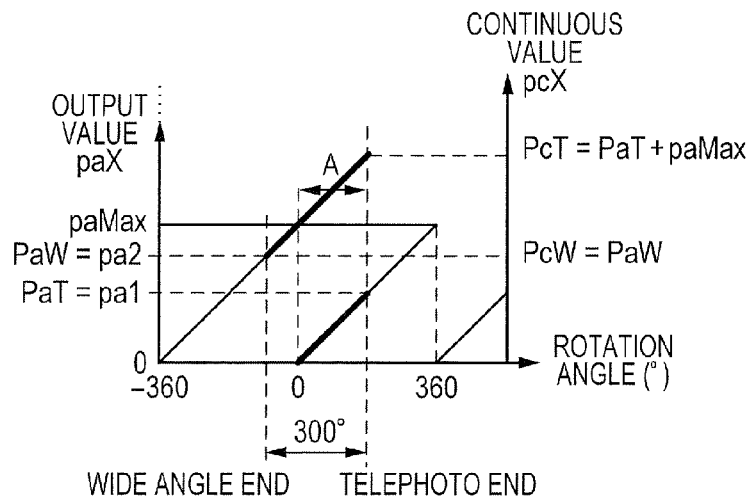
FIG. 3 is a graph showing the relationship between the position of an operation ring and the output value of the absolute encoder in the first embodiment.

FIG. 3 shows the relationship between the driving range of the absolute encoder 110 which corresponds to the movable range (from a wide angle end to a telephoto end) of the operation ring 210 and the output value thereof. The driving range of the absolute encoder 110 which corresponds to the movable range of the operation ring 210 is regarded as 300°. The way to set the wide angle end and the telephoto end is described in detail below. Now, as shown in FIG. 3, an output value PaW of the absolute encoder 110 when the operation ring 210 is positioned at the wide angle end is regarded as pa2 and an output value PaT thereof when the operation ring 210 is positioned at the telephoto end is regarded as pa1 (pa1<pa2).

As shown in FIG. 3, when the operation ring 210 is driven from the wide angle end to the telephoto end, the output value of the absolute encoder 110 changes from pa2 to the maximum value paMax, and immediately after that, becomes zero, and then changes from zero to pa1.

On the other hand, the CPU 140 does not recognize the output value of the absolute encoder 110 as it is as the position of the operation ring 210, but handles a discontinuous point at which the output value changes from the maximum value paMax to zero as described above (left end of a range A in FIG. 3) as a continuous value. Specifically, a wide angle end PcW as a continuous value is regarded as:

$$PcW=PaW. \quad (1)$$

In other words, on a wide angle side which is one side of a point of discontinuity, the output value of the absolute encoder 110 as it is is recognized as a value which represents the position of the operation ring 210.

Further, a telephoto end PcT as a continuous value is regarded as:

$$PcT=PaT+paMax. \quad (2)$$

In other words, the range A shown in FIG. 3 (on a telephoto side which is the other side of the point of discontinuity) is offset by adding thereto the maximum value paMax of the output value of the absolute encoder 110.

By performing this boundary processing, the whole range of the operation ring 210 as a continuous value handled by the CPU 140 is expressed as:

$$PcT-PcW=paMax+PaT-PaW. \quad (3)$$

The CPU 140 stores in the memory unit 150 a wide angle end PaW and a telephoto end PaT which are output values of the absolute encoder 110 as edge positions of the operation ring 210. Further, the CPU 140 stores in the memory unit 150 the above-mentioned wide angle end PcW and telephoto end PcT as continuous values.

Next, processing from the connection of the driving apparatus 100 to the lens barrel 200 to the actual determination of the absolute position is described with reference to FIG. 4 to FIG. 11. First, processing of determining edge positions which is performed only once after the driving apparatus 100 and the lens barrel 200 are connected to each other is described with reference to a flow chart of FIG. 4.

Figure 4:
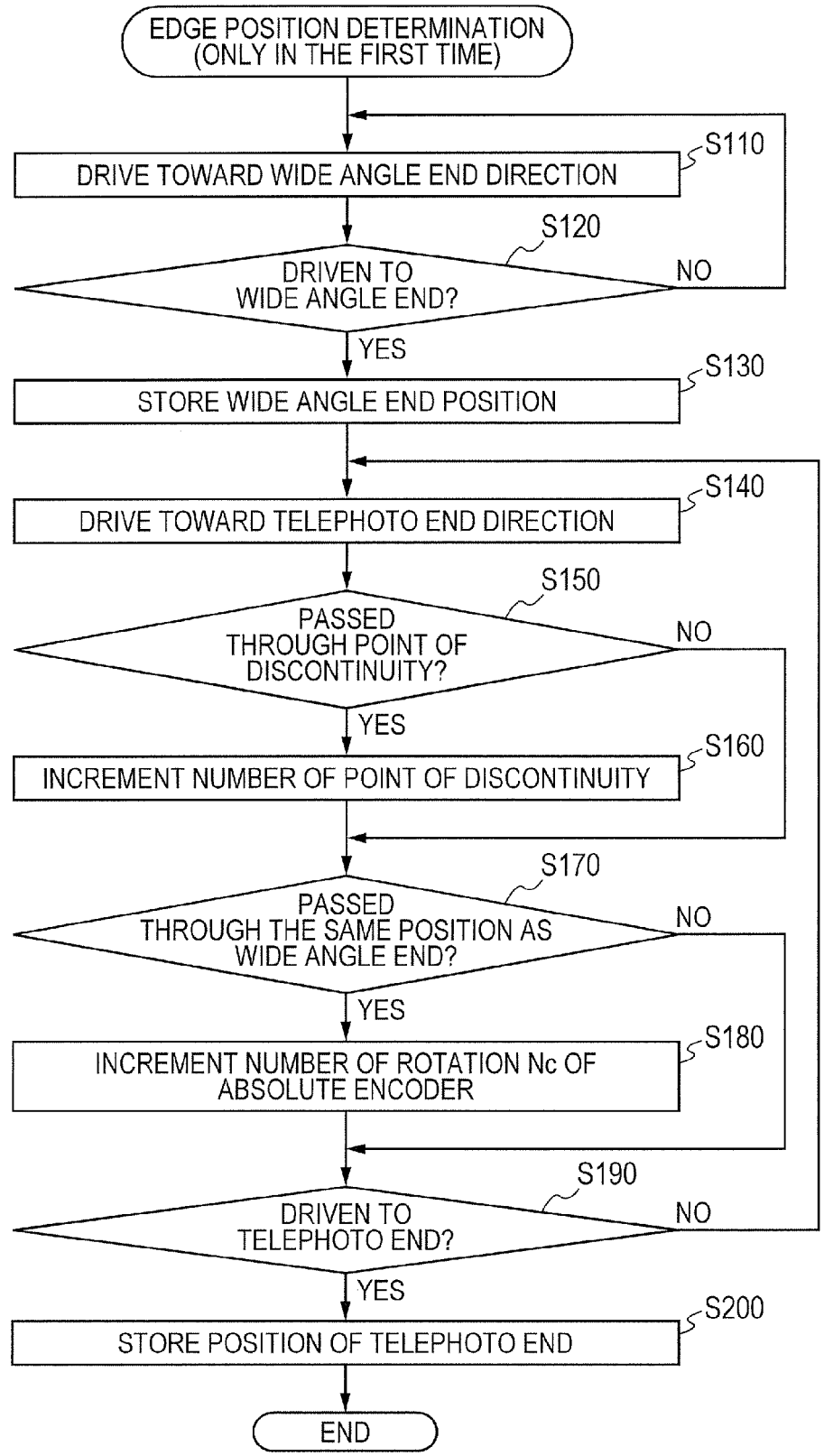
FIG. 4 is a flow chart illustrating processing of determining sin absolute position in the first embodiment.

In Step S110 in FIG. 4, the CPU 140 drives the operation ring 210 toward the wide angle end via the driver 130 and the motor 120.

In Step S120, it is determined whether or not the operation ring 210 has been driven to the wide angle end. When the answer is yes, the process proceeds to Step S130, in which the position of the operation ring 210 obtained by the absolute encoder 110 is stored in the memory unit 150 as a wide angle end position PaW.

When, in Step S120, it is determined that the operation ring 210 has not come at the wide angle end, Step S110 and Step S120 are repeated until it is determined that the operation ring 210 has been driven to the wide angle end. A method of determining whether or not the operation ring 210 has been driven to the wide angle end is not specifically limited. For example, it may be determined that the operation ring 210 has been driven to the wide angle end when the value obtained by the absolute encoder 110 does not change for a predetermined period of time while the motor 120 drives the operation ring 210 toward the wide angle end.

The process then proceeds to Step S140, in which the CPU 140 drives the operation ring 210 toward the telephoto end via the driver 130 and the motor 120, and then, the process proceeds to Step S150.

Step S150 is a step of determining whether or not the output value of the absolute encoder 110 has passed through a point of discontinuity of switching from the maximum value paMax to zero while the operation ring 210 is driven toward the telephoto end. When the answer is yes, the process proceeds to Step S160 and the number of points of discontinuity is incremented by one, and then, the process proceeds to Step S170.

Step S170 is a step of determining whether or not the operation ring 210 has passed through the same position as the position PaW at the wide angle end stored in Step S130 while the operation ring 210 is driven toward the telephoto end. When the answer is yes, the process proceeds to Step S180, in which the number Nc of rotations of the encoder is incremented by one.

In Step S190, it is determined whether or not the operation ring 210 has been driven to the telephoto end. When the answer is yes, the process proceeds to Step S200, in which the position of the operation ring 210 obtained by the absolute encoder 110 is stored in the memory unit 150 as a telephoto end position PaT. In Step S190, when it is determined that the operation ring 210 has not come at the telephoto end, Steps S140 to S190 are repeated until it is determined that the operation ring 210 has been driven to the telephoto end. Specifically, the number of times the absolute encoder 110 passes through the point of discontinuity or the number of rotations of the absolute encoder 110 while the operation ring 210 is driven from the wide angle end to the telephoto end is counted.

After the above-mentioned processing is performed, the CPU 140 performs offset processing of the point of discontinuity based on the stored wide angle end position PaW, telephoto end position PaT, and paMax to store PcW as the wide angle end and PcT as the telephoto end of the continuous value.

Next, a flow after power on or after a reset operation until determination of the absolute position is described with reference to FIG. 5 to FIG. 11. The following description is on the assumption that the above-mentioned processing of determining the edge positions was completed.

Figure 5:
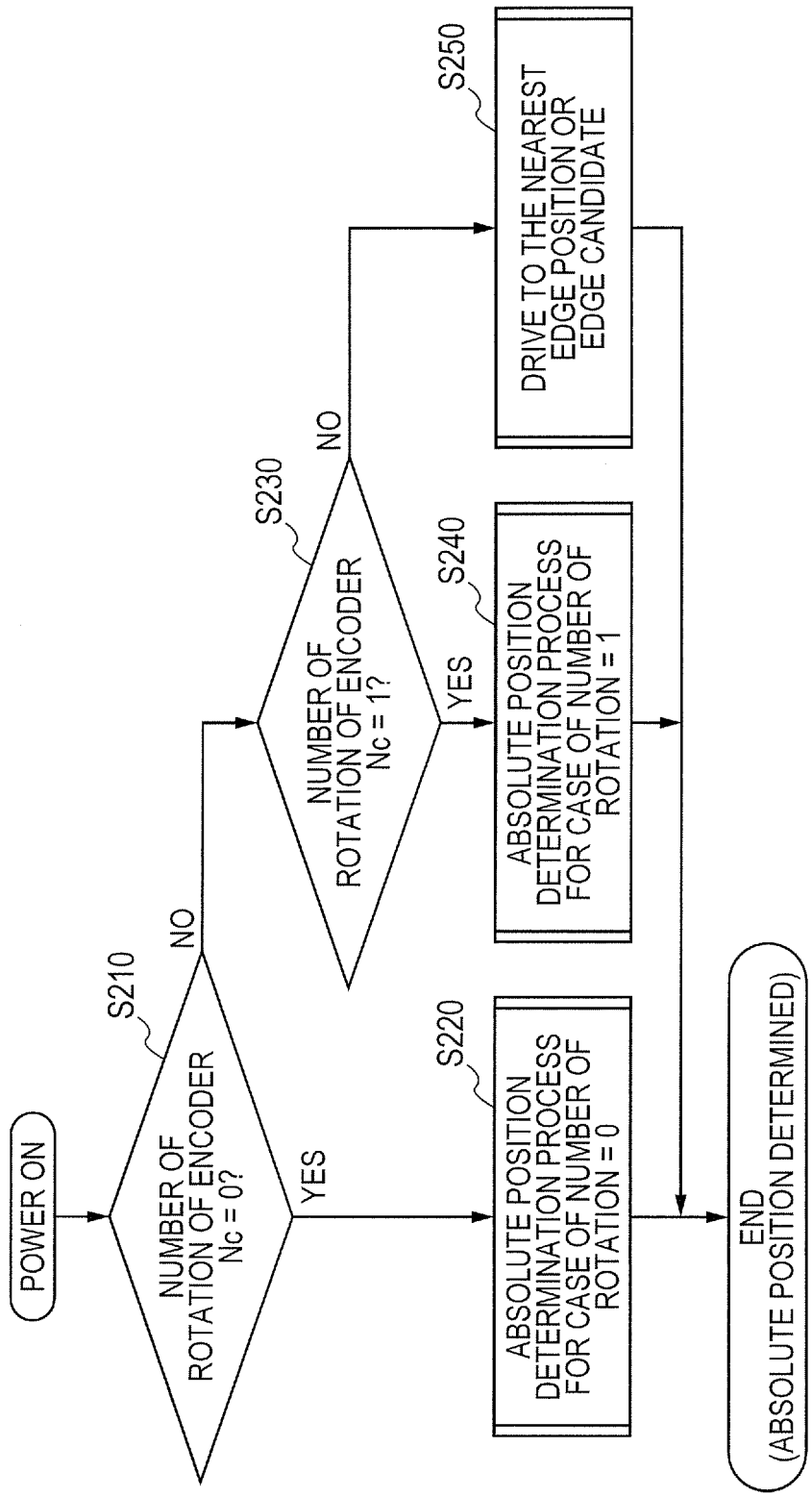
FIG. 5 is a flow chart illustrating the processing of determining an absolute position in the first embodiment.

With reference to the flow chart of FIG. 5, when the power is turned on, in Step S210, when a number Nc of rotations stored in Step S180 in FIG. 4 is zero, that is, when the number of rotations is less than one, the process proceeds to Step S220. In Step S210, when the number Nc of rotations stored in Step S180 in FIG. 4 is equal to or larger than one, the process proceeds to Step S230.

In Step S230, when the number Nc of rotations stored in Step S180 in FIG. 4 is one, the process proceeds to Step S240. When the number Nc of rotations is equal to or larger than two, the process proceeds to Step S250.

Here, the processing in Step S220 in FIG. 5 is described with reference to FIG. 3 again and a flow chart of FIG. 6.

Figure 6:
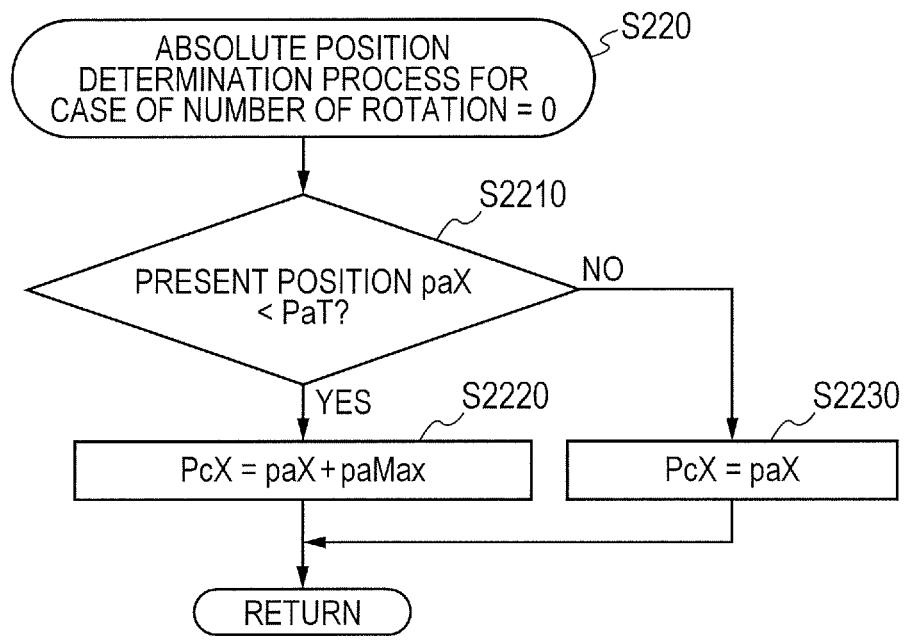
FIG. 6 is a flow chart illustrating the processing of determining an absolute position in the first embodiment.

In Step S2210 in FIG. 6, when an output value paX at the present position is smaller than the output value PaT at the telephoto end position, that is, in the range A in FIG. 3 (on the telephoto side with respect to the point of discontinuity), the process proceeds to Step S2220. In Step S2220, by performing offset processing of adding paMax to above-mentioned paX, the CPU 140 performs conversion into a continuous value pcX which is a continuous value from PcW to PcT.

On the other hand, when the output value paX at the present position is not smaller than the output value PaT at the telephoto end position, that is, between PaW and paMax in FIG. 3 (on the wide angle side with respect to the point of discontinuity), the process proceeds to Step S2230. In Step S2230, correspondences are established in which the output value paX at the present position as it is is the position between PcW and PcT to determine the absolute position.

Figure 10A:
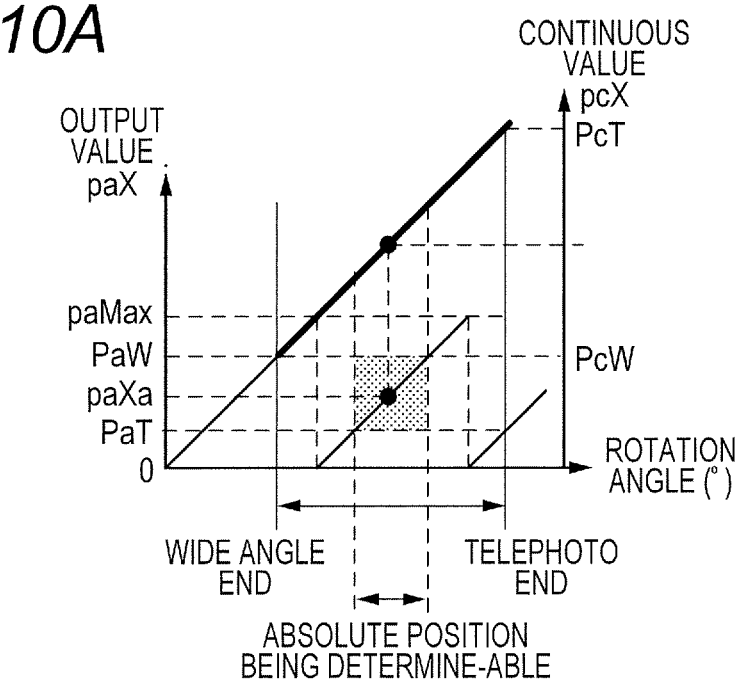
FIG. 10A is a graph showing the relationship between the position of the operation ring and the output value of the absolute encoder in the first embodiment.
Figure 10B:
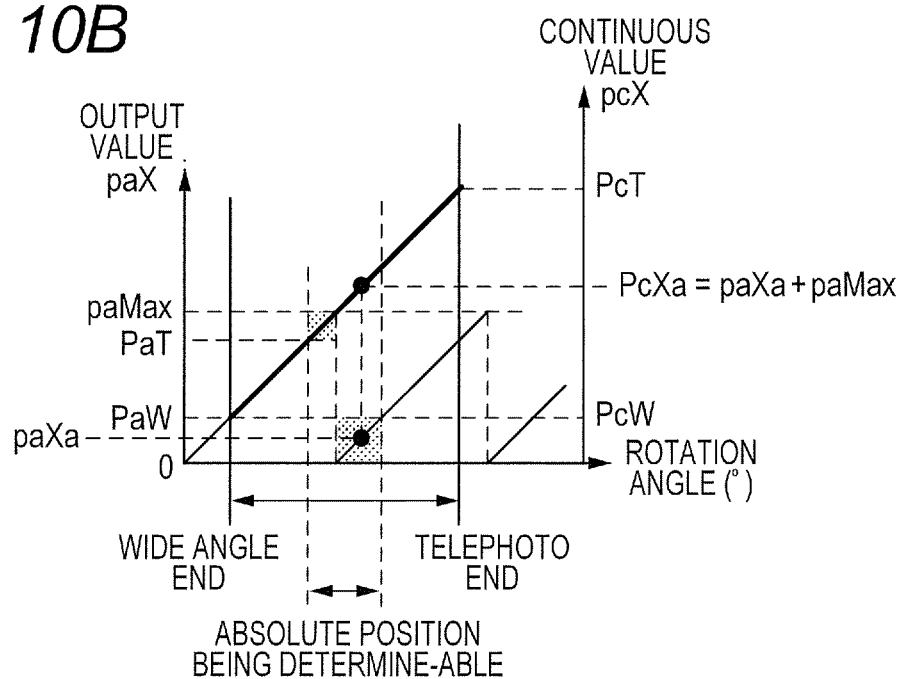
FIG. 10B is a graph showing the relationship between the position Of the operation ring and the output value of the absolute encoder in the first embodiment.

Next, Step S240 when the number Nc of rotations is one (the number of rotations is equal to or larger than one and smaller than two) in the flow chart of FIG. 5 is described with reference to a flow chart of FIG. 7 and FIGS. 10A and 10B. The case where the number of rotations is one is broken into two cases: a case where there are two points of discontinuity as shown in FIG. 10A; and a case where there is one point of discontinuity as shown in FIG. 10B. Here, the case where there are two points of discontinuity as shown in FIG. 10A is described.

Figure 7:
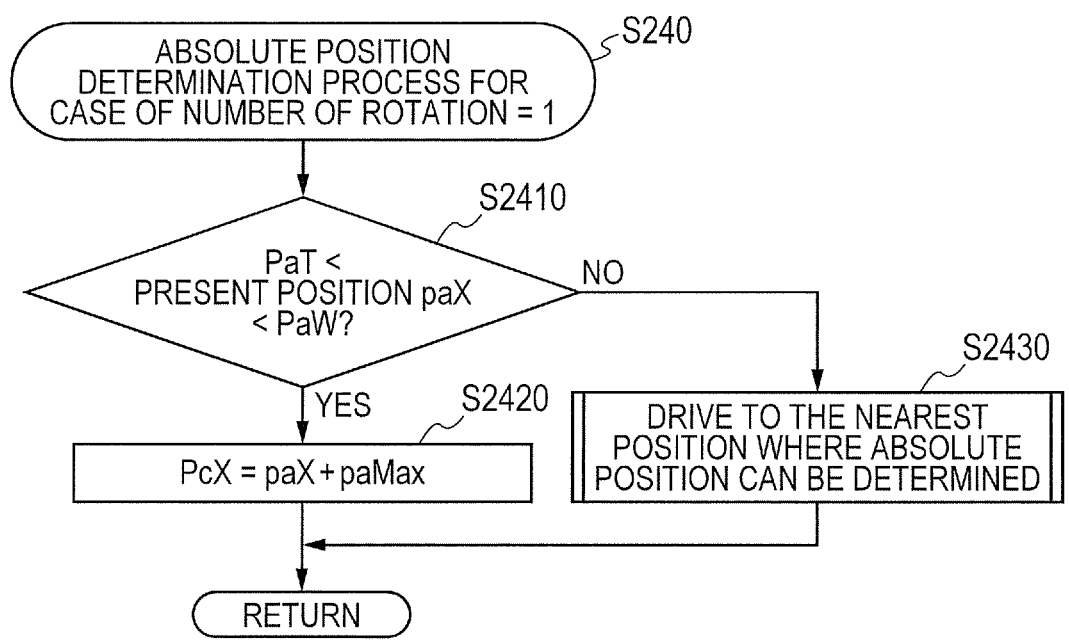
FIG. 7 is a flow chart illustrating the processing of determining an absolute position in the first embodiment.

In Step S2410 in FIG. 7, when the output value paX at the present position is larger than the output value PaT at the telephoto end position and smaller than the output value PaW at the wide angle end position, that is, in a shaded range in FIG. 10A, the process proceeds to Step S2420. When the operation ring 210 is driven from the wide angle end toward the telephoto end, the output value of the absolute encoder 110 changes from PaW to paMax, from paMax to zero, from zero to paMax, again from paMax to zero, and then from zero to PaT.

In this case, the output value passes through the values from PaT to PaW in the shaded range only once. Specifically, in the range from PaT to PaW in which the output value is unique (in a range in which the position at which the movable optical member is driven and the output value of the absolute position detector are in a one-to-one correspondence relationship), like the relationship paXa and PcXa in FIG. 10A, correspondences can be established with the position between PcW and PcT as continuous values.

Further, the shaded range in FIG. 10A is reached from the output value PaW at the wide angle end position through a point of discontinuity, and thus, by offsetting paMax in Step S2420, correspondences are established with the continuous value to determine the absolute position.

On the other hand, in Step S2410, when the output value paX is outside the shaded range in FIG. 10A, the process proceeds to Step S2430. When the operation ring 210 is driven from the wide angle end to the telephoto end, the output value of the absolute encoder 110 passes through values from PaW to paMax and values from zero to PaT which are outside the shaded range, each twice. When the output value is in such a range in which the output value is not unique, correspondences cannot be established with the position between PcW and PcT as continuous values. In such a case, in Step S2430, the operation ring 210 is driven to a position at which the above-mentioned correspondences can be established, or to the telephoto end position or the wide angle end position at which, similarly, the correspondences can be established.

Figure 8:
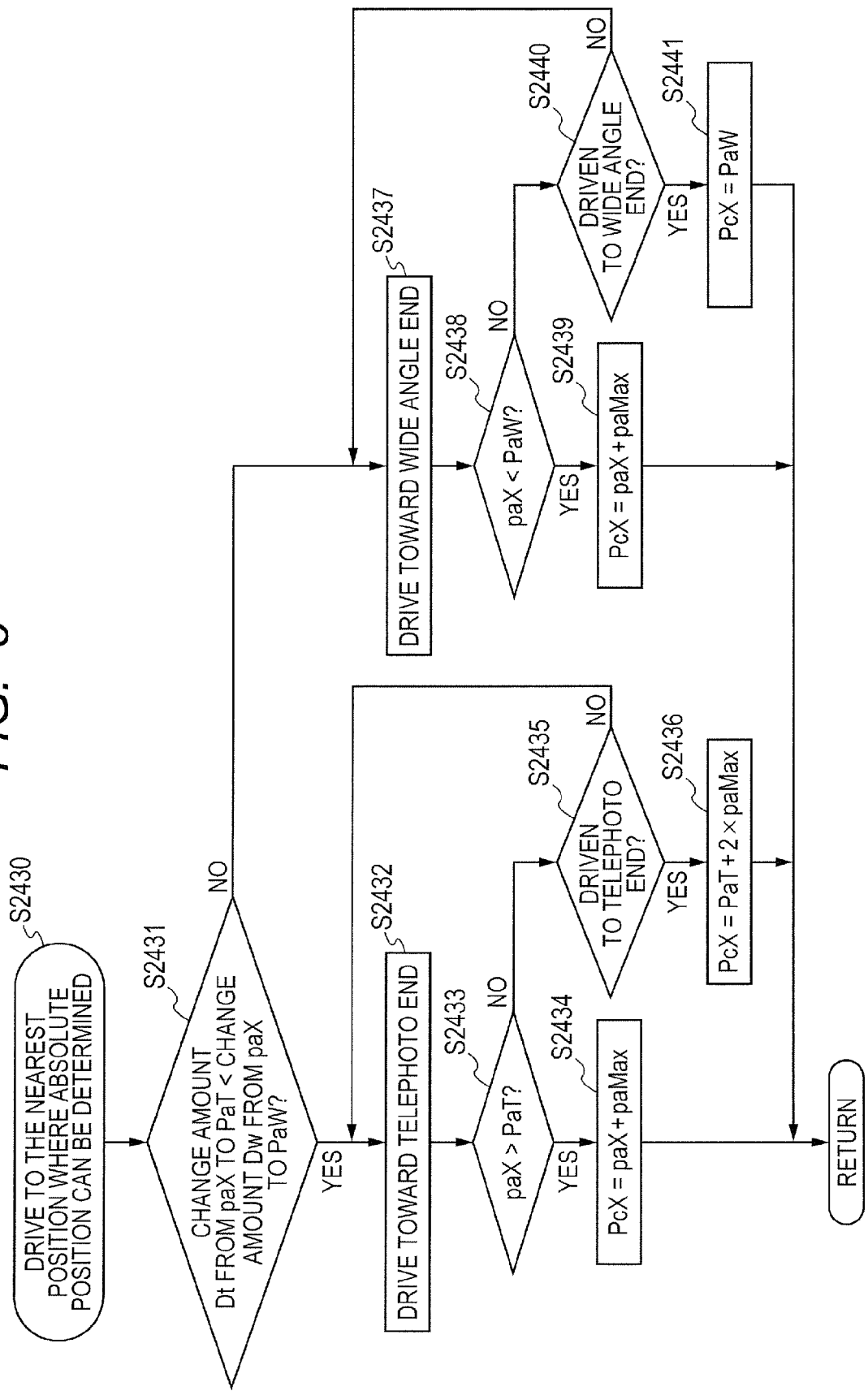
FIG. 8 is a flow chart illustrating the processing of determining an absolute position in the first embodiment.

Here, the processing in Step S2430 in FIG. 7 is described using a flow chart of FIG. 8.

In Step S2431 in FIG. 8, a change amount Dt from the output value paX at the present position to the output value PaT at the telephoto end position when the operation ring 210 is driven toward the telephoto end and a change amount Dw from the output value paX at the present position to the output value PaW at the wide angle end position when the operation ring 210 is driven toward the wide angle end are compared. Here, the change amounts Dt and Dw are described.

When the output value paX at the present position is positioned between PaW and paMax in FIG. 10A, the change amounts Dt and Dw can be expressed as:

$$Dt = paMax - paX + PaT \ (PaW < paX < paMax) \quad (4)$$

and $$Dw = paX - PaW \ (PaW < paX < paMax). \quad (5)$$

Further, when the output value paX at the present position is positioned between zero and PaT in FIG. 10A, the change amounts Dt and Dw can be expressed as:

$$Dt = PaT - paX \ (0 < paX < PaT) \quad (6)$$

and $$Dw = paX - PaW + paMax \ (0 < paX < PaT). \quad (7)$$

In Step S2431 in FIG. 8, the CPU 140 compares Dt and Dw under the above-mentioned conditions. When the change amount Dt is smaller, the process proceeds to Step S2432, in which the operation ring 210 is driven toward the telephoto end. Then, the process proceeds to Step S2433.

In Step S2433, when the output value paX at the present position is larger than PaT, that is, when the output value paX enters the shaded range in FIG. 10A toward the telephoto side, the process proceeds to Step S2434, in which correspondences are established with the position between PcW and PcT that is continuous values. The processing is completely the same as that in Step S2420 in FIG. 7. The shaded range in FIG. 10A extends from the output value PaW at the wide angle end position through a point of discontinuity, and thus, by offsetting paMax in Step S2434, correspondences are established with the continuous value to determine the absolute position.

On the other hand, in Step S2433, when the output value paX at the present position is equal to or smaller than PaT, the process proceeds to Step S2435, in which it is determined whether or not the operation ring 210 has been driven to the telephoto end. When the answer is yes, the process proceeds to Step S2436, in which correspondences are established with the position between PcW and PcT as continuous values.

In this case, the output value paX at the present position is equal to PaT, and passes through a point of discontinuity twice from the output value PaW at the wide angle end position, and thus, correspondences are established with the continuous value by offsetting a value which is twice as large as paMax to determine the absolute position. Therefore, correspondences are established with regard to a continuous value PcX as:

$$PcX = paX + 2 \times paMax = PaT + 2 \times paMax = PcT \quad (8)$$

and the absolute position can be detected.

On the other hand, in Step S2435, when it is determined that the operation ring 210 has not come at the telephoto end, the process returns back to Step S2432, and the above-mentioned processing is repeated until the absolute position is determined in Step S2434 or Step S2436.

In Step S2431, the CPU 140 compares Dt and Dw under the above-mentioned conditions. When the change amount Dw is smaller, or, when Dt and Dw are equal to each other, the process proceeds to Step S2437, in which the operation ring 210 is driven toward the wide angle end. Then, the process proceeds to Step S2438.

In Step S2438, when the output value paX at the present position is smaller than PaW, that is, when the output value paX enters the shaded range in FIG. 10A toward the wide angle side, the process proceeds to Step S2439, in which correspondences are established with the continuous value at a position between PcW and PcT. The processing is completely the same as that in Step S2434. The shaded range in FIG. 10A extends from the output value PaW at the wide angle end position through a point of discontinuity, and thus, by offsetting paMax in Step S2420, correspondences are established with the continuous value to determine the absolute position.

On the other hand, in Step S2438, when the output value paX at the present position is equal to or larger than PaW, the process proceeds to Step S2440, in which it is determined whether or not the operation ring 210 has been driven to the wide angle end. When the answer is yes, the process proceeds to Step S2441, in which correspondences are established with the position between PcW and PcT as continuous values.

In this case, the output value paX at the present position is equal to PaW, and is positioned at the output value PaW at the wide angle end position, and thus, offset processing is not performed, and correspondences with the continuous value are established to determine the absolute position. Therefore, correspondences are established with regard to the continuous value PcX as:

$$PcX = paW = PcW \qquad (9)$$

and the absolute position can be detected.

On the other hand, in Step S2440, when it is determined that the operation ring 210 has not come at the wide angle end, the process returns back to Step S2437, and the above-mentioned processing is repeated until the absolute position is determined in Step S2439 or Step S2441.

As described above, the CPU 140 drives the operation ring 210 toward any one of both the ends of the driving range of the operation ring 210 (toward wide angle end or telephoto end of the zoom lens) at which the output value (PaW or PaT) is nearer to the output value of the absolute encoder 110. When the output value has passed through the output value at the one end, or, when the operation ring 210 has been driven to the one end, the absolute position of the operation ring 210 is determined.

In the above description of Step S240, a case where there are two points of discontinuity as shown in FIG. 10A is described, but the present invention is similarly applicable to a case where there is one point of discontinuity as shown in FIG. 10B. Specifically, when the output value paX at the present position after power on or after a reset operation is positioned in the shaded range in FIG. 10B, the absolute position can be determined. When the output value paX at the present position after power on or after a reset operation is positioned outside the shaded range, by driving the operation ring 210 to a position at which correspondences can be established, or to the telephoto end position or the wide angle end position at which correspondences can be similarly established as described above, correspondences are established with the position between PcW and PcT as continuous values.

Next, Step S250 to which the process proceeds when, in Step S230 in FIG. 5, the number No of rotations is equal to or larger than two, is described with reference to a flow chart of FIG. 9 and FIG. 11.

Figure 11:
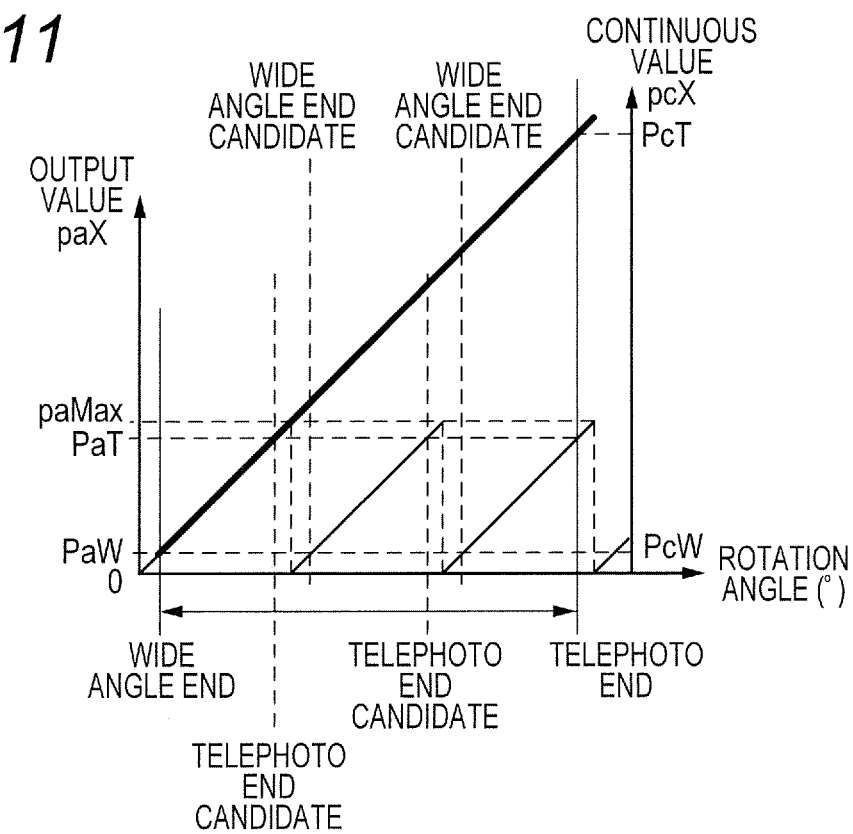
FIG. 11 is a graph showing the relationship between the position of the operation ring and the output value of the absolute encoder in the first embodiment.

FIG. 11 is a graph showing the relationship between the position of the operation ring 210 and the output value of the absolute encoder 110 while the operation ring 210 is driven in the movable range when the driving range of the absolute encoder 110 is equal to or larger than two rotations and is smaller than three rotations. As shown in FIG. 11, the output value PaW at the wide angle end position and the output value PaT at the telephoto end position are set.

Further, the driving range of the absolute encoder 110 is equal to or larger than two rotations and is smaller than three rotations, and thus, there are, except for the ends, each two positions at which the output value is equal to PaW and PaT, which are herein referred to as wide angle end candidates and telephoto end candidates, respectively.

Further, the number of rotations is equal to or larger than two, and thus, differently from the cases in which the number of rotations is smaller than two, the output value of the absolute encoder 110 is not unique over the entire range.

Specifically, when the operation ring 210 is positioned in such a range in which the output value is not unique, correspondences cannot be established with the position between PcW and PcT as continuous values. Therefore, in Step S250 in FIG. 5, the operation ring 210 is driven to a position at which correspondences can be established, or, to the telephoto end position or the wide angle end position at which correspondences can be similarly established.

Figure 9:
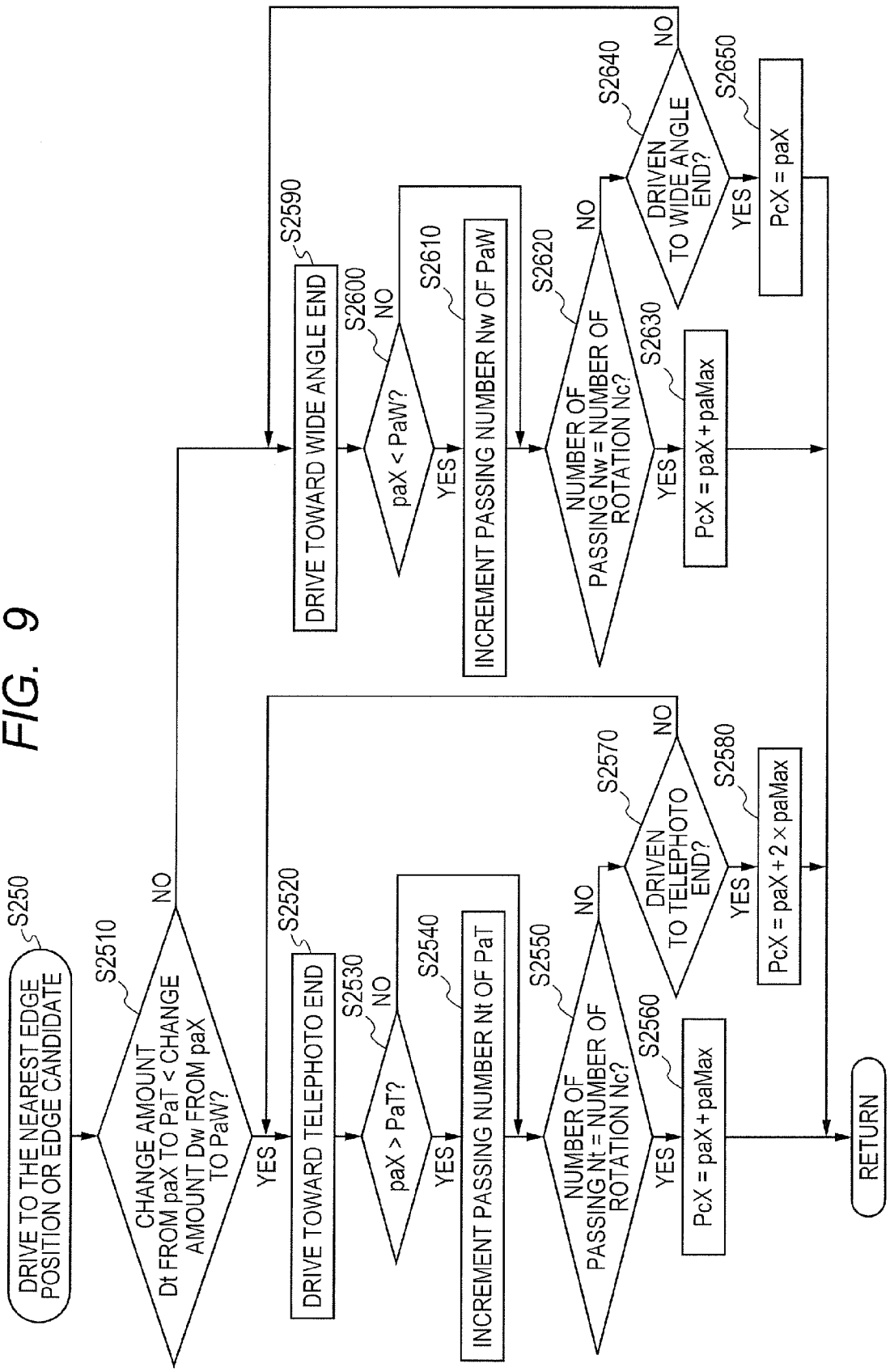
FIG. 9 is a flow chart illustrating the processing of determining an absolute position in the first embodiment.

In Step S2510 in FIG. 9, the change amount Dt from the output value paX at the present position to the output value PaT at the nearest telephoto end candidate position when the operation ring 210 is driven toward the telephoto end and the change amount Dw from the output value paX at the present position to the output value PaW at the nearest wide angle end candidate position when the operation ring 210 is driven toward the wide angle end are compared. The CPU 140 compares Dt and Dw. When the change amount Dt is smaller, the process proceeds to Step S2520, in which the operation ring 210 is driven toward the telephoto end. Then, the process proceeds to Step S2530.

In Step S2530, when the output value paX at the present position is larger than PaT, the process proceeds to Step S2540, in which a number Nt of passing PaT is incremented. Then, the process proceeds to Step S2550.

On the other hand, in Step S2530, when it is not determined that the output value paX at the present position is larger than PaT, the process proceeds to Step S2550.

In Step S2550, the CPU 140 determines whether or not the number Nt of passing PaT is equal to the number of rotations which is the driving range of the absolute encoder 110. When the answer is yes, the process proceeds to Step S2560. In Step S2560, correspondences are established with the position between PcW and PcT as continuous values. Specifically, in FIG. 11, when the number of passing PaT is equal to the number of rotations while the operation ring 210 is driven toward the telephoto end, it can be determined that the telephoto end candidate is the telephoto end candidate next to the telephoto end position on the wide angle side. With reference to FIG. 11, the position passes from the output value PaW at the wide angle end position through a point of discontinuity, and thus, by offsetting paMax in Step S2560, correspondences are established with the continuous value to determine the absolute position.

On the other hand, when, in Step S2550, the number of passing PaT is not equal to the number of rotations, the process proceeds to Step S2570, in which it is determined whether or not the operation ring 210 has been driven to the telephoto end. When the answer is yes, the process proceeds to Step S2580, in which a correspondence can be established with the telephoto end position PcT as a continuous value. In this case, the output value paX at the present position is equal to PaT, and passes through a point of discontinuity twice from the output value PaW at the wide angle end position, and thus, correspondences are established with the continuous value by offsetting a value which is twice as large as paMax to determine the absolute position.

Next, in Step S2510, the CPU 140 compares Dt and Dw. When the change amount Dw is smaller, or, when Dt and Dw are equal to each other, the process proceeds to Step S2590. In Step S2590, the operation ring 210 is driven toward the wide angle end, and then, the process proceeds to Step S2600 and the subsequent steps. By performing processing similar to that from Step S2520 to Step S2580 described above, correspondences are established with the continuous value to determine the absolute position.

Specifically, the CPU 140 establishes correspondences between the output value of the absolute encoder 110 and the continuous value using the output value of the absolute encoder 110 which is equal to the output value PaT at the telephoto end position or the output value PaW at the wide angle end position of the operation ring 210, or, using the output value of the absolute encoder 110 at which the number of rotations of the absolute encoder 110 corresponds to the position of a single rotation from the end to determine the absolute position.

As described above, according to this embodiment, the edge positions are determined after the driving apparatus 100 and the lens barrel 200 are connected to each other. When the edge positions are stored after power on or after a reset operation, the processing of determining the absolute position is performed based on the number of rotations of the absolute encoder 110 and the number of points of discontinuity of the output value which are detected. Therefore, even when the movable range of the operation ring 210 varies depending on the kind of the lens barrel 200, the absolute position can be detected irrespective of the rotational amount of the absolute encoder 110 corresponding to the movable range of the operation ring 210.

When there is no point at which the output value of the absolute encoder 110 changes from the maximum value paMax to zero while the operation ring 210 is driven from the wide angle end to the telephoto end, the offset processing described above is not necessary, and PcW may be regarded as PaW and PcT may be regarded as PaT.

Further, in Steps S2432 and S2433 and Steps S2437 and S2433 in FIG. 8, when the operation ring 210 is driven for the purpose of determining the absolute position, in order to prevent the operation ring 210 from violently impacting a mechanical edge for limiting the operating range, the following may be adopted. When the operation ring 210 passes near an edge position, the CPU 140 may reduce the speed of driving the operation ring 210. Similarly, in Steps S2520 and S2530 and Steps S2590 and S2600 in FIG. 9, when the operation ring 210 passes near a position at which the output value at an edge position is output, the CPU 140 may reduce the speed of driving the operation ring 210.

Embodiment 2

In the following, with reference to FIG. 12 and FIG. 14, a driving apparatus according to a second embodiment of the present invention is described. The driving apparatus can detect an absolute position without the necessity for an adjustment of a position detector when connected to a lens barrel and without the necessity for a special mechanism.

In the first embodiment, only the rotary absolute encoder 110 as a position detector included in the driving apparatus 100 is used to detect the position of the operation ring 210.

In this embodiment, a case is described in which, as an absolute position detector, in addition to the absolute encoder, a POT (second absolute position detector) is further used.

Further, similarly to the case of the first embodiment, the present invention is applicable irrespective of the rotational amount of the absolute encoder 110 with respect to the movable range of the lens.

Further, with regard to the POT, in a related-art case, when the dead zone of the POT is included in the driving range of the lens, the position cannot be detected, and thus, it is necessary to make an adjustment without fail so that the dead zone is not included in the movable range of the operation ring. In this embodiment, it is also not necessary to make an adjustment of the POT when connected to a lens barrel, and the dead zone may be included in the movable range of the operation ring.

In the first embodiment, when the number of rotations of the absolute encoder 110 is equal to or larger than one, in a case where the output value of the absolute encoder 110 when the power is turned on is not unique, correspondences cannot be established with the continuous value from PcW to PcT. Therefore, in Step S250 in FIG. 5, the operation ring 210 is driven to a position at which correspondences with the continuous value can be established (including the telephoto end position and the wide angle end position).

In this embodiment, a case is described in which, by using a POT 160 together, even when the output value of the absolute encoder 110 when the power is turned on is not unique, the absolute position is determined without driving the operation ring 210.

Figure 12:
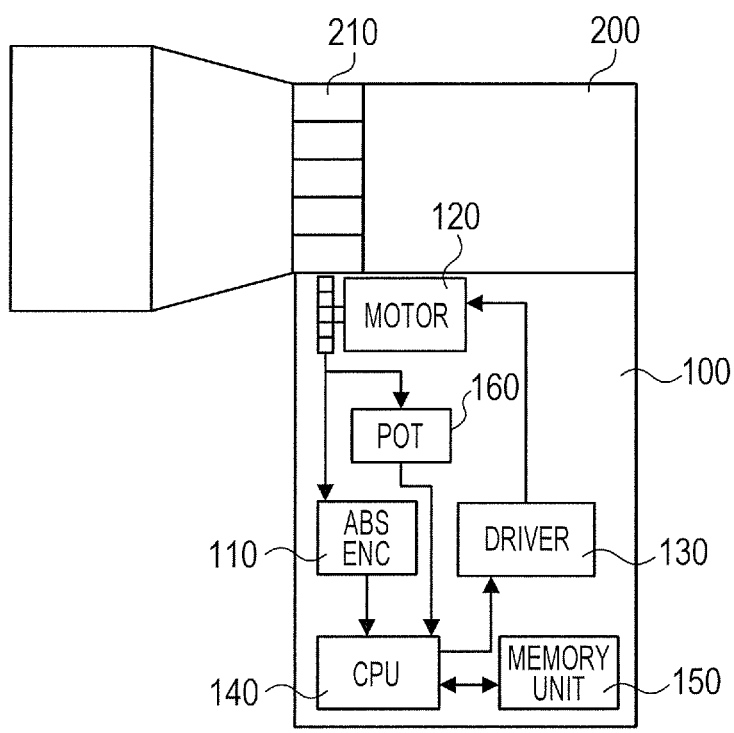
FIG. 12 is a block diagram illustrating a structure of a driving apparatus according to a second embodiment of the present invention.

FIG. 12 is a block diagram illustrating a structure of the driving apparatus 100 according to the second embodiment of the present invention, and illustrates a state after the driving apparatus 100 is connected to the lens barrel 200. Like reference numerals are used to designate like members in the block diagram of FIG. 1, and points different from those in the first embodiment are merely described.

The driving apparatus 100 includes the POT 160 in addition to the members included in the structure of the first embodiment. The POT 160 is, similarly to the absolute encoder 110, connected via a gear (not shown) to the operation ring 210. Further, the POT 160 itself rotates in accordance with the rotation of the operation ring 210, and outputs, to the CPU 140, an output value obtained by A/D converting a voltage value corresponding to its own rotational position via an A/D converter (not shown). In the following, the output value of the POT 160 means the output value obtained after the A/D conversion.

The CPU 140 detects the position of the operation ring 210 based on the output values of the absolute encoder 110 and the POT 160.

Figure 13:
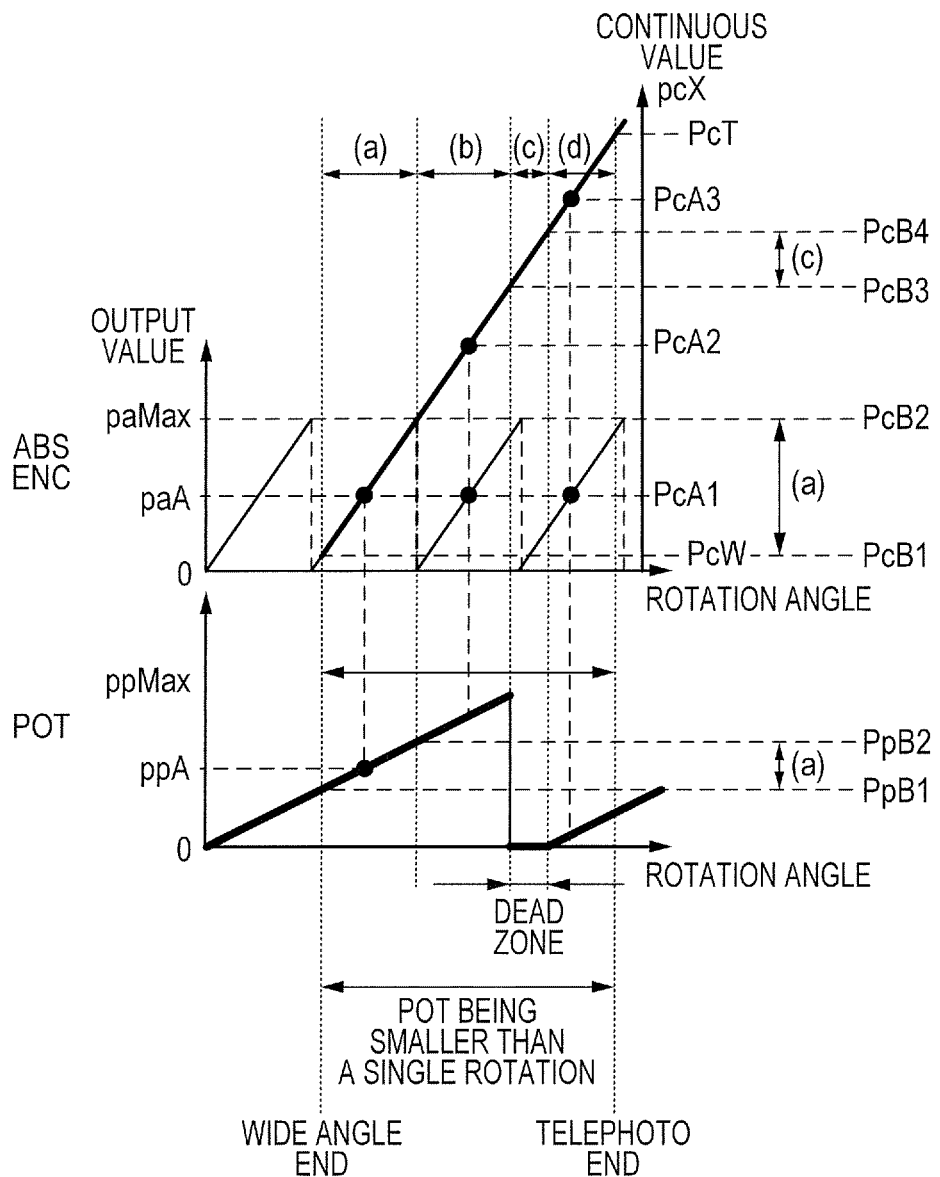
FIG. 13 is a graph showing the relationship among the position of an operation ring and the output values of an absolute encoder and a POT in the second embodiment.

Here, the POT 160 is described with reference to FIG. 13. FIG. 13 is a graph showing the relationship between the output value and the rotational position of the absolute encoder 110 and the relationship between the output value and the rotational position of the POT 160, and the relationship thereof with the position of the operation ring 210 in this embodiment. An upper portion of FIG. 13 shows the output value of the absolute encoder 110, and a lower portion thereof shows the output value of the POT 160. The output value of the absolute encoder 110 is similar to that in the first embodiment, and thus, detailed description thereof is omitted.

As shown in the lower portion of FIG. 13, the POT 160 outputs a value which ranges from zero to a maximum value ppMax. Further, when the POT 160 is rotated in the forward direction, the output value increases, and, when the POT 160 is rotated in the reverse direction, the output value decreases. For example, as shown in the figure, a position at which the output value of the POT 160 is zero is regarded as 0 degree. When the POT 160 is rotated in the forward direction, the output value becomes the maximum value ppMax immediately before a single rotation. After that, there is a dead zone, and, the output value becomes zero at the position of a single rotation. After that, as the POT 160 is rotated further in the forward direction, the output value increases, then there is a dead zone, and then zero is output every single rotation. This cycle is repeated. On the other hand, when the POT 160 is rotated in the reverse direction, the output value decreases from the maximum value ppMax toward zero. After zero is output, there is a dead zone, and then the maximum value ppMax is output. As the POT 160 is rotated further in the reverse direction, the output value decreases. The dead zone of the POT 160 is a rotation angle range in which an output value that can uniquely determine the rotation angle is not output, but it is assumed that there is an output that can determine that the rotation angle range is in the dead zone. For example, a predetermined output value can be zero or ppMax. In this embodiment, in the dead zone, zero is output.

When the operation ring 210 is driven, the absolute encoder 110 and the POT 160 output, to the CPU 140, output values corresponding to their own rotational positions, respectively. In this case, it is not necessary that the number of rotations of the absolute encoder 110 and the number of rotations of the POT 160 are the same.

However, with regard to the POT 160, it is desired that the POT 160 be assembled such that the number of rotations of the POT 160 is smaller than one even when connected to a lens barrel including the operation ring 210 having a wide movable range. In FIG. 13, the absolute encoder 110 rotates about twice and a half and the POT 160 rotates less than once when the operation ring 210 is driven over the entire range.

Next, processing from the connection of the driving apparatus 100 to the lens barrel 200 to the actual determination of the absolute position according to this embodiment is described with reference to FIG. 13 and FIG. 14.

First, the edge positions of the absolute encoder 110 are determined. This processing of determining the edge positions is exactly the same as the processing illustrated in the flow chart of FIG. 4 which is described in the first embodiment, and thus, description thereof is omitted here.

Next, in order to establish correspondences between the continuous value, which is obtained after the above-mentioned processing of determining the edge positions, and the output value of the POT 160, the continuous value is divided into multiple areas.

A method of dividing the continuous value into the multiple areas is described with reference to a flow chart of FIG. 14. This processing of dividing the continuous value into the multiple areas is, similarly to the processing of determining the edge positions described with reference to FIG. 4, processing which is performed only once after the driving apparatus 100 and the lens barrel 200 are connected to each other. For the sake of simplicity of description, it is assumed that the processing of determining the edge positions in FIG. 4 is already performed.

Figure 14:
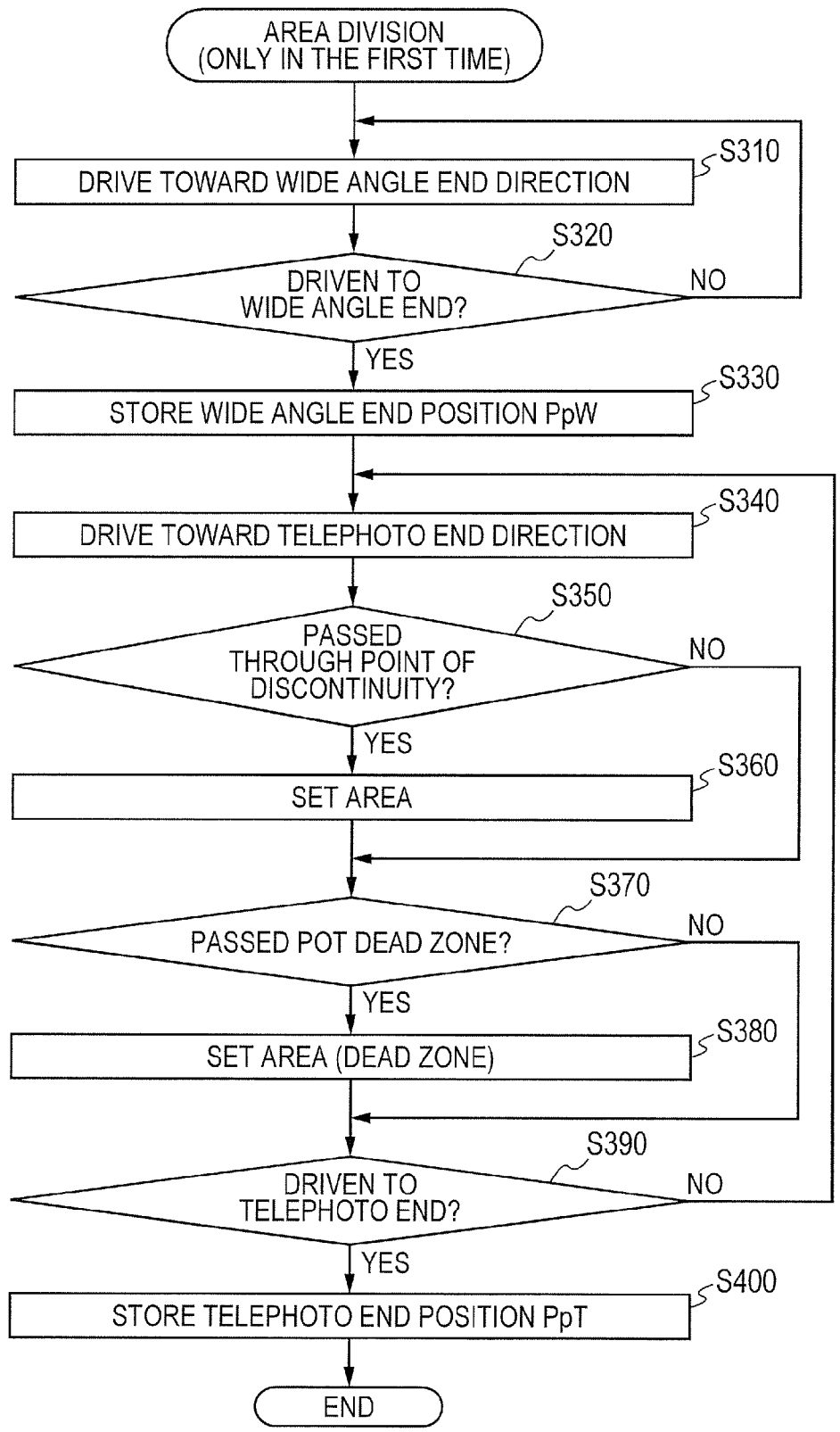
FIG. 14 is a flow chart illustrating processing of determining a zone for determining an absolute position in the second embodiment.

In Step S310 in FIG. 14, the CPU 140 drives the operation ring 210 toward the wide angle end via the driver 130 and the motor 120, and then, the process proceeds to Step S320.

In Step S320, it is determined whether or not the operation ring 210 has been driven to the wide angle end. When the answer is yes, the process proceeds to Step S330, in which the position of the operation ring 210 obtained by the POT 160 is stored in the memory unit 150 as a wide angle end position PpW.

When, in Step S320, it is determined that the operation ring 210 has not come at the wide angle end, Step S310 and Step S320 are repeated until it is determined that the operation ring 210 has been driven to the wide angle end.

The process then proceeds to Step S340, in which the CPU 140 drives the operation ring 210 toward the telephoto end via the driver 130 and the motor 120, and then, the process proceeds to Step S350.

Step S350 is a step of determining whether or not the output value of the absolute encoder 110 passes through a point of discontinuity of switching from the maximum value paMax to zero while the operation ring 210 is driven toward the telephoto end. When the answer is yes, the process proceeds to Step S360 to set an area.

Specifically, a correspondence is established between PcB1 which is a continuous value and PpB1 which is the output value of the POT in FIG. 13 and is stored in the memory unit 150.

Next, the process proceeds to Step S370. Step S370 is a step of determining whether or not the output value has passed through the dead zone of the POT 160 while the operation ring 210 is driven toward the telephoto end. When the answer is yes, the process proceeds to Step S380, in which an area is set with regard to continuous values corresponding to the dead zone.

Specifically, in the continuous value in FIG. 13, the values of PcB3 and PcB1 which are positions corresponding to ends, respectively, of the dead zone, are stored in the memory unit 150.

Then, the process proceeds to Step S390. In Step S390, it is determined whether or not the operation ring 210 has been driven to the telephoto end. When the answer is yes, the process proceeds to Step S400, in which an area from an end of the area set immediately before to the telephoto end is set, to terminate this processing. In Step S390, when it is determined that the operation ring 210 has not come at the telephoto end, Steps S340 to S390 are repeated until it is determined that the operation ring 210 has been driven to the telephoto end.

Areas a to d shown in FIG. 13 are exemplary areas set by performing the above-mentioned processing.

The output value which is output from the absolute encoder 110 after the power is turned on is regarded as paA shown in FIG. 13. As shown in FIG. 13, there are three continuous values that establish correspondence with paA: PcA1; PcA2; and PcA3.

In this case, the output value of the POT 160 is ppA, and thus, it is understood that the area in which the operation ring 210 is positioned at present is the area a. The CPU 140 can determine that the value that establishes correspondence with paA in a range from PcW (=PcB1) to PcB2, that is, the area a, is PcA1. In this way, the absolute position corresponding to the output value paA at the present position can be determined.

As described above, according to this embodiment, by using the POT 160 together, even when the output value of the absolute encoder 110 when the power is turned on is not unique, the absolute position can be determined without driving the operation ring 210.

Further, as described above, the continuous value is divided info the multiple areas. In particular, the continuous value is divided into the areas based on the dead zone of the output value of the POT 160. This enables determination of the absolute position irrespective of the position of the operation ring 210, even when the dead zone of the POT is included in the driving range of the operation ring 210, similarly to a case where the dead cone is not included, which is impossible in the related-art case.

Further, a method of dividing the continuous value into the multiple areas is described, but the dividing method is not limited thereto. Any dividing method may be applied insofar as the absolute position can be determined when the output value of the absolute encoder 110 is not unique with respect to the driving range of the operation ring 210 as shown in FIG. 13.

By forming a lens apparatus including the driving apparatus according to the present invention, and an image pickup apparatus including the lens apparatus and an imaging device for taking an object image, it is possible to obtain such action and effect of the present invention that the absolute position of a movable optical member can be detected without the necessity for a special mechanism such as a slip mechanism and initial adjustment of a position detector when connected to a lens barrel.

The exemplary embodiments of the present invention are described above, but the present invention is not limited to these embodiments and can be modified and changed variously within the scope of the gist thereof.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-282224, filed Dec. 26, 2012, which is hereby incorporated by reference herein in its entirety.

What is claimed is:

1. A driving apparatus for driving an optical member of a lens barrel, the driving apparatus comprising:
    a rotation detector configured to rotate in conjunction with a rotation of a rotational member that rotates in conjunction with a driving of the optical member to detect a rotational amount of the rotational member, and output a unique value in accordance with a rotation angle of the rotation detector within a range of a single rotation,
    wherein a change of an output value from the rotation detector in response to a change of rotation amount of the rotation detector is discontinuous once in every single rotation, and
    wherein the optical member has a driving range corresponding to a rotation amount smaller than a single rotation of the rotation detector; and
    a controller configured to:
        output an output value after adding a predetermined value to the output value of the rotation detector in a case where a position of the rotation detector in a rotational direction is on one side with respect to a position at which the change of the output value from the rotation detector in response to the change of rotation amount of the rotation detector is discontinuous; and
        output an output value without adding the predetermined value to the output value of the rotation detector in a case where the position of the rotation detector in the rotational direction is on the other side with respect to the position at which the change of the output value from the rotation detector in response to the change of rotation amount of the rotation detector is discontinuous.

2. The driving apparatus according to claim 1, further comprising:
    a storage unit that stores the output value of the rotation detector at both ends of the driving range of the optical member, the number of rotations of the rotation detector corresponding to the driving range, and a number of points at which the change of the output value from the rotation detector in response to the change of rotation amount of the rotation detector is discontinuous in the driving range,
    wherein the position of the optical member is determined based on the output value, the number of rotations, and the number of points at which the change of the output value from the rotation detector in response to the change of rotation amount of the rotation detector is discontinuous.

3. The driving apparatus according to claim 1, further comprising:
    a second detector, separately from the rotation detector, configured to rotate and detect the position of the optical member,
    wherein a number of rotations of the second detector corresponds to the driving range of the optical member is less than one; and
    wherein the position of the optical member is determined based on the output value of the rotation detector and an output value of the second detector.

4. The driving apparatus according to claim 1, wherein the controller is configured to output an absolute position of the optical member.

5. A driving apparatus for driving an optical member of a lens barrel, the driving apparatus comprising:
    a rotation detector configured to rotate in conjunction with a rotation of a rotational member that rotates in conjunction with a driving of the optical member to detect a rotational amount of the rotational member, and output a unique value in accordance with a rotation angle of the rotation detector within a range of a single rotation,
    wherein a change of an output value from the rotation detector in response to a change of rotation amount of the rotation detector is discontinuous once in every single rotation, and
    wherein the optical member has a driving range corresponding to a rotation amount equal to or larger than a single rotation and smaller than two rotations of the rotation detector; and
    a controller configured to:
        determine a position of the optical member based on the output value of the rotation detector in a case where the output value of the rotation detector is a value output at a single position in the driving range of the optical member; and
        drive the optical member to a nearest position at which the position of the optical member and the output value of the rotation detector are in a one-to-one correspondence relationship, and then determine the position of the optical member in a case where the output value of the rotation detector is an output value output at multiple points in the driving range of the optical member.

6. The driving apparatus according to claim 5, further comprising:
    a storage unit that stores the output value of the rotation detector at both ends of the driving range of the optical member,
    wherein the controller drives the optical member toward one of the ends of the driving range of the optical member at which the output value is nearer to the output value of the rotation detector, then when the output value has passed through the output value at the one of both the ends or when the optical member has been driven to the one of the ends, the controller determines a position of the movable member based on the output value of the rotation detector in a case where the output value of the rotation detector is a value output at a single position in the driving range of the optical member, and
    wherein the controller drives the optical member to a nearest position at which the position of the optical member and the output value of the rotation detector are in a one-to-one correspondence relationship and then determines the position of the optical member in a case where the output value of the rotary absolute position detector is an output value output at multiple points in the driving range of the movable optical member.

7. The driving apparatus according to claim 5, wherein the controller is configured to output an absolute position of the optical member.

8. A driving apparatus for driving an optical member of a lens barrel, the driving apparatus comprising:
a rotation detector configured to rotate in conjunction with a rotation of a rotational member that rotates in conjunction with a driving of the optical member to detect a rotational amount of the rotational member, and output a unique value in accordance with a rotation angle of the rotation detector within a range of a single rotation,
wherein a change of an output value from the rotation detector in response to a change of rotation amount of the rotation detector is discontinuous once in every single rotation, and
wherein the optical member has a driving range corresponding to a rotation amount equal to or larger than two rotations of the rotation detector; and
a controller configured to drive the optical member to a position at which the output value of the rotation detector is at one of an end of the driving range of the optical member or a position that is apart from the end by a single rotation of the rotation detector, and then determine the position of the optical member.

9. The driving apparatus according to claim 8, further comprising:
a storage unit that stores the output value of the rotation detector at both ends of the driving range of the optical member and the number of rotations of the rotation detector corresponding to the driving range,
wherein the controller drives the optical member toward one of the ends of the driving range of the optical member at which the output value is nearer to the output value of the rotation detector, and when a number of times that the output value of the rotation detector passes through the output value of the rotation detector at the one of the ends is the number of rotations stored in the storage unit or when the optical member has been driven to the one of the ends, the controller drives the optical member to a position at which the output value of the rotation detector is at one of an end of the driving range of the optical member and a position that is apart from the end by a single rotation of the rotation detector, and then determines the position of the optical member.

10. The driving apparatus according to claim 8, wherein the controller is configured to output an absolute position of the optical member.

11. A lens apparatus having a driving apparatus configured to drive an optical member of a lens barrel of the lens apparatus, the driving apparatus comprising:
a rotation detector configured to rotate in conjunction with a rotation of a rotational member that rotates in conjunction with a driving of the optical member to detect a rotational amount of the rotational member, and output a unique value in accordance with a rotation angle of the rotation detector within a range of a single rotation,
wherein a change of an output value from the rotation detector in response to a change of rotation amount of the rotation detector is discontinuous once in every single rotation, and
wherein the optical member has a driving range corresponding to a rotation amount smaller than a single rotation of the rotation detector; and
a controller configured to:
output an output value after adding a predetermined value to the output value of the rotation detector in a case where a position of the rotation detector in a rotational direction is on one side with respect to a position at which the change of the output value from the rotation detector in response to the change of rotation amount of the rotation detector is discontinuous; and
output an output value without adding the predetermined value to the output value of the rotation detector in a case where the position of the rotation detector in the rotational direction is on the other side with respect to the position at which the change of the output value from the rotation detector in response to the change of rotation amount of the rotation detector is discontinuous.

12. An image pickup apparatus comprising:
a lens apparatus comprising a driving apparatus configured to drive an optical member, the driving apparatus comprising:
a rotation detector configured to rotate in conjunction with a rotation of a rotational member that rotates in conjunction with a driving of the optical member to detect a rotational amount of the rotational member, and output a unique value in accordance with a rotation angle of the rotation detector within a range of a single rotation,
wherein a change of an output value from the rotation detector in response to a change of rotation amount of the rotation detector is discontinuous once in every single rotation, and
wherein the optical member has a driving range corresponding to a rotation amount smaller than a single rotation of the rotation detector;
a controller configured to:
output an output value after adding a predetermined value to the output value of the rotation detector in a case where a position of the rotation detector in a rotational direction is on one side with respect to a position at which the change of the output value from the rotation detector in response to the change of rotation amount of the rotation detector is discontinuous; and
output an output value without adding the predetermined value to the output value of the rotation detector in a case where the position of the rotation detector in the rotational direction is on the other side with respect to the position at which the change of the output value from the rotation detector in response to the change of rotation amount of the rotation detector is discontinuous; and
an imaging device connectable to the lens apparatus so as to take an object image.

13. A lens apparatus having a driving apparatus configured to drive an optical member of a lens barrel of the lens apparatus, the driving apparatus comprising:
a rotation detector configured to rotate in conjunction with a rotation of a rotational member that rotates in conjunction with a driving of the optical member to detect a rotational amount of the rotational member, and output a unique value in accordance with a rotation angle of the rotation detector within a range of a single rotation,
wherein a change of an output value from the rotation detector in response to a change of rotation amount of the rotation detector is discontinuous once in every single rotation, and
wherein the optical member has a driving range corresponding to a rotation amount equal to or larger than a single rotation and smaller than two rotations of the rotation detector; and
a controller configured to:

determine a position of the optical member based on the output value of the rotation detector in a case where the output value of the rotation detector is a value output at a single position in the driving range of the optical member; and drive the optical member to a nearest position at which the position of the optical member and the output value of the rotation detector are in a one-to-one correspondence relationship, and then determine the position of the optical member in a case where the output value of the rotation detector is an output value output at multiple points in the driving range of the optical member.

14. An image pickup apparatus comprising:

a lens apparatus having a driving apparatus configured to drive an optical member of a lens barrel of the lens apparatus, the driving apparatus comprising:

a rotation detector configured to rotate in conjunction with a rotation of a rotational member that rotates in conjunction with a driving of the optical member to detect a rotational amount of the rotational member, and output a unique value in accordance with a rotation angle of the rotation detector within a range of a single rotation, wherein a change of an output value from the rotation detector in response to a change of rotation amount of the rotation detector is discontinuous once in every single rotation, and wherein the optical member has a driving range corresponding to a rotation amount equal to or larger than a single rotation and smaller than two rotations of the rotation detector;

a controller configured to:
  determine a position of the optical member based on the output value of the rotation detector in a case where the output value of the rotation detector is a value output at a single position in the driving range of the optical member; and drive the optical member to a nearest position at which the position of the optical member and the output value of the rotation detector are in a one-to-one correspondence relationship, and then determine the position of the optical member in a case where the output value of the rotation detector is an output value output at multiple points in the driving range of the optical member; and an imaging device connectable to the lens apparatus so as to take an object image.

15. A lens apparatus having a driving apparatus configured to drive an optical member of a lens barrel of the lens apparatus, the driving apparatus comprising:

a rotation detector configured to rotate in conjunction with a rotation of a rotational member that rotates in conjunction with a driving of the optical member to detect a rotational amount of the rotational member, and output a unique value in accordance with a rotation angle of the rotation detector within a range of a single rotation, wherein a change of an output value from the rotation detector in response to a change of rotation amount of the rotation detector is discontinuous once in every single rotation, and wherein the optical member has a driving range corresponding to a rotation amount equal to or larger than two rotations of the rotation detector; and a controller configured to drive the optical member to a position at which the output value of the rotation detector is at one of an end of the driving range of the optical member or a position that is apart from the end by a single rotation of the rotation detector, and then determine the position of the optical member.

16. An image pickup apparatus comprising:

a lens apparatus having a driving apparatus configured to drive an optical member of a lens barrel of the lens apparatus, the driving apparatus comprising:

a rotation detector configured to rotate in conjunction with a rotation of a rotational member that rotates in conjunction with a driving of the optical member to detect a rotational amount of the rotational member, and output a unique value in accordance with a rotation angle of the rotation detector within a range of a single rotation, wherein a change of an output value from the rotation detector in response to a change of rotation amount of the rotation detector is discontinuous once in every single rotation, and wherein the optical member has a driving range corresponding to a rotation amount equal to or larger than two rotations of the rotation detector;

a controller configured to drive the optical member to a position at which the output value of the rotation detector is at one of an end of the driving range of the optical member or a position that is apart from the end by a single rotation of the rotation detector, and then determine the position of the optical member; and an imaging device connectable to the lens apparatus so as to take an object image.

\* \* \* \* \*